United States Patent
Agnon et al.

(10) Patent No.: US 6,225,714 B1
(45) Date of Patent: May 1, 2001

(54) ELECTRIC MOTOR, ESPECIALLY A PERMANENTLY EXCITED DIRECT CURRENT MOTOR

(75) Inventors: Reuben Agnon, Sasbach; Walter Lehnert, Buehlertal; Christian Allgeier, Gaggenau; Otto Brass, Buehl, all of (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 09/420,859

(22) Filed: Oct. 19, 1999

(30) Foreign Application Priority Data

Jan. 14, 1999 (DE) .............................. 199 01 104

(51) Int. Cl.⁷ .............................. H02K 5/24; H02K 5/00; H02K 1/12
(52) U.S. Cl. .............................. 310/51; 310/256; 310/254; 310/89
(58) Field of Search .............................. 310/179, 182, 310/183, 190, 197, 51, 154, 256, 254, 89

(56) References Cited

U.S. PATENT DOCUMENTS

| | | | |
|---|---|---|---|
| 2,667,591 | * | 1/1954 | Gindroz .............................. 310/254 |
| 4,252,328 | * | 2/1981 | Raj et al. .............................. 277/1 |
| 4,385,251 | * | 5/1983 | Mallick et al. .............................. 310/178 |
| 4,528,473 | * | 7/1985 | Tezuka .............................. 310/256 |
| 4,619,588 | * | 10/1986 | Moore, III .............................. 417/366 |
| 5,391,954 | * | 2/1995 | Takehara et al. .............................. 310/89 |
| 5,698,918 | * | 12/1997 | Shinoda et al. .............................. 310/89 |
| 5,903,083 | * | 5/1999 | Mukai et al. .............................. 310/263 |

FOREIGN PATENT DOCUMENTS

| | | |
|---|---|---|
| 28 10 215 | 9/1979 | (DE) . |
| 42 24 628 A1 | 1/1994 | (DE) . |

* cited by examiner

Primary Examiner—Nestor Ramirez
Assistant Examiner—Dang Dinh Le

(57) ABSTRACT

The electric motor, especially a permanently excited direct current motor, has a housing (16) carrying a magnetic pole (15) and a grounding ring (17) made from magnetically conductive material and mounted on the housing. In order to reduce the noise generation of the motor the grounding ring (17) is a knit article made from a thread-form or wire-form magnetically conductive material.

8 Claims, 1 Drawing Sheet

ELECTRIC MOTOR, ESPECIALLY A PERMANENTLY EXCITED DIRECT CURRENT MOTOR

BACKGROUND OF THE INVENTION

1. Field of the Invention

The present invention relates to an electric motor, and, more particularly, to a permanently excited direct current electric motor comprising a housing carrying a magnetic pole and a grounding ring arranged on it.

2. Prior Art

Grounding or short-circuiting rings made from magnetically conducting material, e.g. from steel, are used in permanently excited direct current motors, in order to conduct the magnetic flux of the permanent magnet to the stator. Furthermore, the motor housing itself, or an additional steel ring, may be employed for this purpose.

A motor housing of a small electric motor is known from German Patent Document DE 28 10 21 5 A1, in which a housing carrying a permanent magnetic sector of a stator is made from corrosion-resistant galvanized steel plate. A grounding ring that is similarly made from corrosion-resistant steel plate is arranged on the housing in order to provide a sufficiently large grounding cross-section for conducting the magnetic flux in a motor of greater power.

In another known small motor described in German Patent Document DE 42 24 628 A1 the pole housing carrying the magnetic pole is made from a corrosion-resistant sheet metal, for example from galvanized steel plate, and has a grounding ring made from a similar corrosion-resistant sheet metal material on its outer side. Fins that are folded around the wall of the pole housing without play are cut into the end faces of the cylindrical grounding ring, so that the grounding ring is at least secured axially on the pole housing.

In operation of this sort of motor the vibrational modes of the housing itself or of the grounding ring-housing system may be easily excited, so that the housing and/or the grounding ring-housing system generates sound transmitted by the surrounding air at the eigenfrequencies of the housing or the grounding-ring housing system. Additional damping devices and/or damping measures are usually required to take care of this undesirable situation.

SUMMARY OF THE INVENTION

It is an object of the present invention to provide an improved electric motor, especially an improved direct current motor, having reduced noise or sound generation.

These objects, and others that will be made more apparent hereinafter, are attained in a permanently excited direct current electric motor comprising a housing carrying a magnetic pole and a grounding ring arranged on the housing.

According to the invention the grounding ring is made from a thread-form or wire-form magnetically conductive material.

The electric motor according to the invention has the advantage that the additional damping devices and/or damping measures mentioned hereinabove are not needed or included, since the grounding ring is made from a thread-form or wire-form magnetically conductive material, preferably from a woven or knitted article consisting of the magnetically conductive material, which acts both to conduct the magnetic flux and also to damp the vibrations of the housing. The grounding ring thus acts as a vibration quenching device so that secondary sound damping and/or sound absorbing measures can be avoided.

The term "wire-form" means that the magnetically conductive material consists of wires made of the magnetically conductive material and the term "thread-form" means that the magnetic conductive material consists of threads of the magnetically conductive material.

Further features and improvements are part of preferred embodiments described in the following description and claimed in the following dependent claims.

It is particularly advantageous when the grounding ring is made from a ferromagnetic material, preferably knitted from steel wire. The preferred embodiment of the grounding ring using the steel wire simultaneously provides good sound insulating and good sound absorbing properties, since, on the one hand, vibrations of the housing are damped by the mass of the grounding ring and, on the other hand, vibrations are hardly conducted at all by the knitted structure, which thus has a sound insulting effect, while the magnetic properties in contrast are not impaired.

In another embodiment of the invention the grounding ring is connected under tension or tensionally connected to the housing. A good mechanical and magnetic coupling may be attained in this way, so that the grounding ring may reliably fulfill is its dual purpose.

Although it is possible to wind a knit article made from thread-form or wireform magnetically conductive material in one or more layers around the electric motor housing carrying the magnetic pole, according to a preferred embodiment of the invention the grounding ring is made from a seamless circular or round knit article. Because of the structure of this embodiment it is especially simple to mount the grounding ring on the housing, because the grounding ring only needs to be pushed on the housing like a tightly fitting stocking. The knit article usually has some elasticity in the direction of the row of knitted loops, thus in the circumferential direction around the circular or round knit article, so that it will just fit around the housing when it is suitably designed according to the dimensions of the housing in order to achieve the required fit around the housing.

BRIEF DESCRIPTION OF THE DRAWING

The objects, features and advantages of the invention will now be illustrated in more detail with the aid of the following description of the preferred embodiments, with reference to the accompanying figures in which.

DESCRIPTION OF THE PREFERRED EMBODIMENTS

Figure 1:
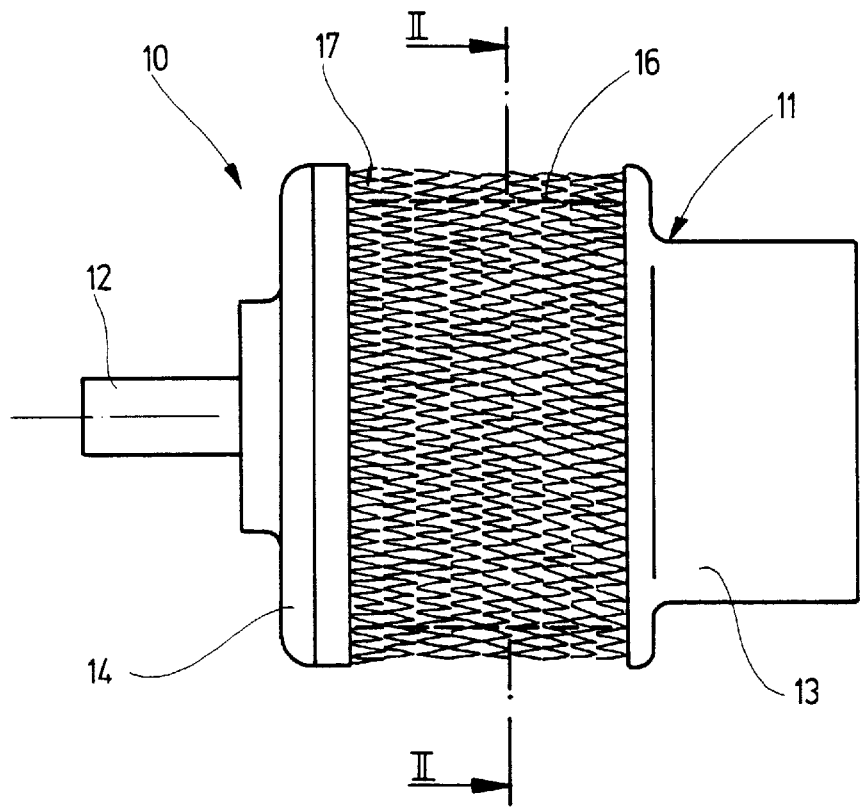
FIG. 1 is a schematic side view of an electric motor.
Figure 2:
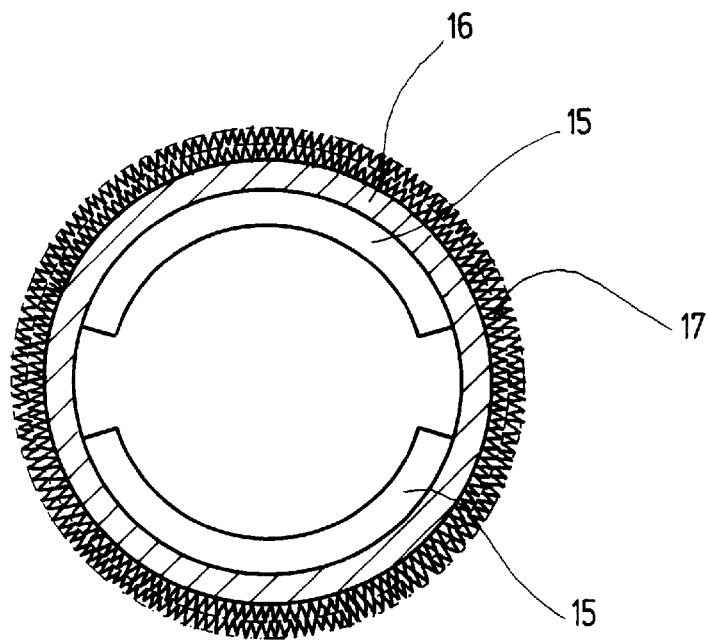
FIG. 2 is a transverse cross-sectional view through the electric motor according to the invention, taken along the section lines II—II of FIG. 1.

An electric motor 10 has a motor housing 11, from which a section of a motor shaft 12 protrudes in a conventional manner as shown in FIG. 1. The motor shaft, which carries an armature, is mounted in the motor housing 11 in the conventional manner. The motor housing 11 comprises a bearing cover 14 and a bearing section 13 for this purpose. A housing, which is called a pole housing 16 in the following description of preferred embodiments, is arranged between the bearing cover 14 and the bearing section 13. The pole housing 16 carries a magnetic pole 15.

The pole housing 16 comprises a magnetically conductive plate, especially a corrosion-resistant plate and is connected with the bearing cover 14 and the bearing section 13 in a suitable manner. Particularly it is possible to form the pole housing 16 in one piece with the bearing section 13.

A grounding ring 17 that is made from wire-form or thread-form magnetically conductive material is arranged on or around the pole housing 16. Basically the entire laminar structure may be made from wire-form or thread-form material, as long as it has sufficient strength to form a ring-like jacket. A fleece or felt material can be employed. However it is preferably when the grounding ring 17 is woven or knitted from wire.

Although it is especially possible to provide a steel wire mesh or gauze or other mesh or gauze made from magnetically conductive material, which then is similarly wound around the pole housing 16 like a sheet, it is preferable to use a knit article, since a knit article transmits both shear forces and compressive forces less effectively than a wire mesh or gauze and thus has better vibrational insulating and damping properties.

All suitable magnetically conductive, especially ferromagnetic, material can be used for making the knit article used to make the grounding ring 17. Preferably a steel wire knit article, which is pushed on the outer peripheral surface of the pole housing 16 like a ring, is used. A seamless circular knit article in which the rows of knit loops run in a circumferential direction is particularly suitable for the grounding ring 17. Then the elastic properties of the knit article in the circumferential direction can be used to produce the tensional connection of the grounding ring 17 to the pole housing 17.

The mass and density of the knit grounding ring 17 is selected according to the size of the magnetic flux to be guided and the frequencies to be damped or attenuated.

The arrangement according to the invention including the knit grounding ring 17 made from steel wire provides even more sound damping and sound insulation than the previously described sound insulating and damping properties, because of the non-uniform surface having a textile-like structure that impairs generation of sound in air.

The disclosure in German Patent Application 199 01 104.4 of Jan. 14, 1999 is incorporated here by reference. This German Patent Application describes the invention described hereinabove and claimed in the claims appended hereinbelow and provides the basis for a claim of priority for the instant invention under 35 U.S.C. 119.

While the invention has been illustrated and described as embodied in an electric motor, especially a permanently excited direct current motor, it is not intended to be limited to the details shown, since various modifications and changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention. What is claimed is new and is set forth in the following appended claims:

We claim:

1. An electric motor comprising a housing (16) carrying a magnetic pole (15), and a grounding ring (17) mounted on said housing (16);

wherein the grounding ring (17) is made from a wire-form or thread-form magnetically conductive material, and wherein the grounding ring (17) is made from a knit article, a mesh or a gauze.

2. The electric motor as defined in claim 1, wherein the grounding ring (17) is made from a ferromagnetic material.

3. An electric motor comprising a housing (16) carrying a magnetic pole (15), and a grounding ring (17) mounted on said housing (16);

wherein the grounding ring (17) comprises a wire-form or thread-form magnetically conductive material and the grounding ring (17) is a knit article.

4. The electric motor as defined in claim 3, wherein said knit article is made from steel wire.

5. An electric motor comprising a housing (16) carrying a magnetic pole (15), and a grounding ring (17) mounted on said housing (16);

wherein said grounding ring (17) comprises a wire-form or thread-form magnetically conductive material, and wherein said grounding ring (17) consists of a seamless circular knit article.

6. An electric motor comprising a motor housing (11);

an armature with a motor shaft (12) mounted in the motor housing (11);

a pole housing (16) carrying a magnetic pole (15); and a grounding ring (17) for conducting magnetic flux and damping vibrations of the pole housing;

wherein said grounding ring (17) is mounted on said pole housing (16) and consists of a wire-form or thread-form magnetically conductive material.

7. The electric motor as defined in claims 1, 3, 5 or 6, wherein said grounding ring (17) is tensionally connected to said housing (16).

8. The electric motor as defined in claims 1, 3, 5 or 6 consisting of a permanently excited direct current motor.

* * * * *